United States Patent
Joseph et al.

(10) Patent No.: US 11,049,051 B2
(45) Date of Patent: Jun. 29, 2021

(54) WELLSITE POWER MAPPING AND OPTIMIZATION

(71) Applicant: Schlumberger Technology Corporation, Sugar Land, TX (US)

(72) Inventors: Jijo Oommen Joseph, Houston, TX (US); Olivier Clerc, Houston, TX (US); Steven Schilling, Sealy, TX (US); William Troy Huey, San Antonio, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 540 days.

(21) Appl. No.: 14/852,930

(22) Filed: Sep. 14, 2015

(65) Prior Publication Data
US 2017/0074076 A1 Mar. 16, 2017

(51) Int. Cl.
*G06Q 10/06* (2012.01)
*G06Q 50/06* (2012.01)

(52) U.S. Cl.
CPC ....... *G06Q 10/06312* (2013.01); *G06Q 50/06* (2013.01); *Y02P 90/82* (2015.11)

(58) Field of Classification Search
USPC ...................................................... 705/7.22
See application file for complete search history.

(56) References Cited

U.S. PATENT DOCUMENTS

| | | | |
|---|---|---|---|
| 2009/0014170 A1* | 1/2009 | Zubrin | E21B 43/168 166/90.1 |
| 2010/0132949 A1* | 6/2010 | DeFosse | E21B 43/26 166/308.1 |
| 2011/0016342 A1* | 1/2011 | Rowan | G06F 11/3062 713/340 |

OTHER PUBLICATIONS

Barrado et al. (A. Barrado, J. Pleite, A. Lazaro, R. Vazquez and E. Olias, "Utilization of the power losses map in the design of DC/DC converters," PESC 98 Record. 29th Annual IEEE Power Electronics Specialists Conference (Cat. No. 98CH36196), Fukuoka, 1998, pp. 1543-1547 vol. 2, doi: 10.1109/PESC.1998.703381. Date.*
Joseph et al., "Centralized Articulating Power System", U.S. Appl. No. 14/853,037, filed Sep. 14, 2015, 26 pages.
Joseph et al., "Operational Optimization", U.S. Appl. No. 62/149,944, filed Apr. 20, 2015, 9 pages.

* cited by examiner

*Primary Examiner* — Matthew D Henry
(74) *Attorney, Agent, or Firm* — Michael L. Flynn

(57) ABSTRACT

Embodiments disclosed prove a method for improving power usage for an oilfield operation. The method includes analyzing power usage for the oilfield operation, mapping power consumption for the oilfield operation; mapping power utilization for the oilfield operation; and improving power utilization for the oilfield operation.

18 Claims, 8 Drawing Sheets

WELLSITE POWER MAPPING AND OPTIMIZATION

BACKGROUND

Various oilfield operations which produce petroleum products from underground formations require power to operate numerous pieces of equipment. Equipment used at an oilfield location may perform a unique function and due to the duration of the job, such as a fracturing operation, may be brought to the site via trailers, trucks and skids. The trailers and skids may be brought to the site by tractors. Tractors are generally used to haul equipment used in oilfield operations (such as pumps and blenders) to various field locations.

On a fracturing location, many equipment are used inefficiently to perform functions they have not been designed to. Tractors are a good example to illustrate this statement. Although designed and primarily used to haul equipment to location, in North America, more than 1,000 tractors are utilized to perform functions during fracturing jobs. Most often these functions require very low power and are performed during a very short duration. On fracturing pumps for instance, tractors are used to provide the 60 HP required to start the 2500 HP deck engine. This power is supplied from the 425 HP tractor engine, for a few minutes only.

SUMMARY

Embodiments disclosed prove a method for improving power usage for an oilfield operation. The method includes analyzing power usage for the oilfield operation, mapping power consumption for the oilfield operation; mapping power utilization for the oilfield operation; and improving power utilization for the oilfield operation.

Embodiments disclosed also provide a method for improving power usage for a plurality of equipment in an oilfield operation. The method includes determining an amount of power supplied by the plurality of equipment, determining power utilization of the plurality of equipment; mapping power utilization for the plurality of equipment, and improving power utilization for the plurality of the equipment.

Embodiments disclosed also provide a method for improving a maintenance operation of an oilfield operation. The method includes defining the maintenance operation for the oilfield operation, mapping power utilization for the oilfield operation, mapping the maintenance operation against the power utilization for the oilfield operation, and improving the maintenance operation by performing the maintenance operation during low power utilization.

DETAILED DESCRIPTION

Figure 1:
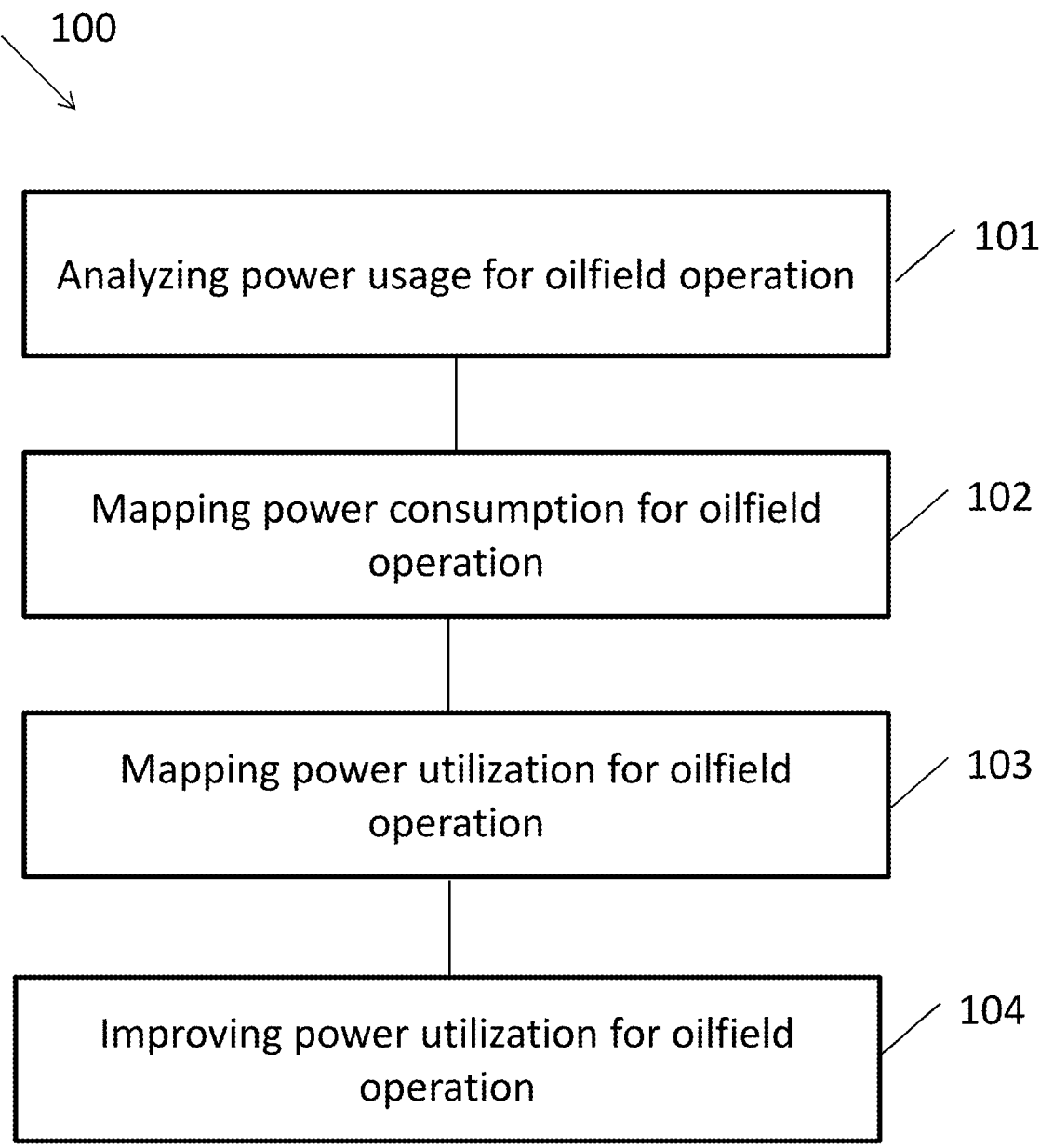
FIG. 1 illustrates a method for optimizing power utilization for equipment at an oilfield operation, according to an embodiment.

Reference will now be made in detail to embodiments of the present disclosure, examples of which are illustrated in the accompanying drawings. In the drawings and the following description, like reference numerals are used to designate like elements, where convenient. It will be appreciated that the following description is not intended to exhaustively show all examples, but is merely exemplary.

Embodiments of the present disclosure generally relate to a method for optimizing the power usage at an oilfield operation, for example optimizing the power usage for a fracturing operation, or more specifically optimizing the power usage for a fracturing pump. By optimizing the power utilization of equipment at an oilfield location, a reduction in operating and maintenance costs may be realized, along with reducing the environmental impact of the oilfield operation. Also provided are embodiments of mapping the power usage at an oilfield operation, for example for a fracturing operation, or more specifically mapping the power usage for one or more fracturing pump deck engines at the oilfield operation.

Referring now to the figures, shown in FIG. 1 is a method 100 of improving power utilization for equipment at an oilfield operation. While the method may be applied to any oilfield operation, such as but not limited to, drilling, completion, production, workover, stimulation, etc., the following description of a method will be described with regard to a fracturing operation. In fracturing, a fluid is pumped down a wellbore at a flow rate and pressure sufficient to fracture a subterranean formation. After the fracture is created or, optionally, in conjunction with the creation of the fracture, proppants may be injected into the wellbore and into the fracture. The proppant is a particulate material added to the pumped fluid to produce a slurry. The proppant within the fracturing fluid forms a proppant pack to prevent the fracture from closing when pressure is released, providing improved flow of recoverable fluids, i.e. oil, gas, or water.

Figure 2:
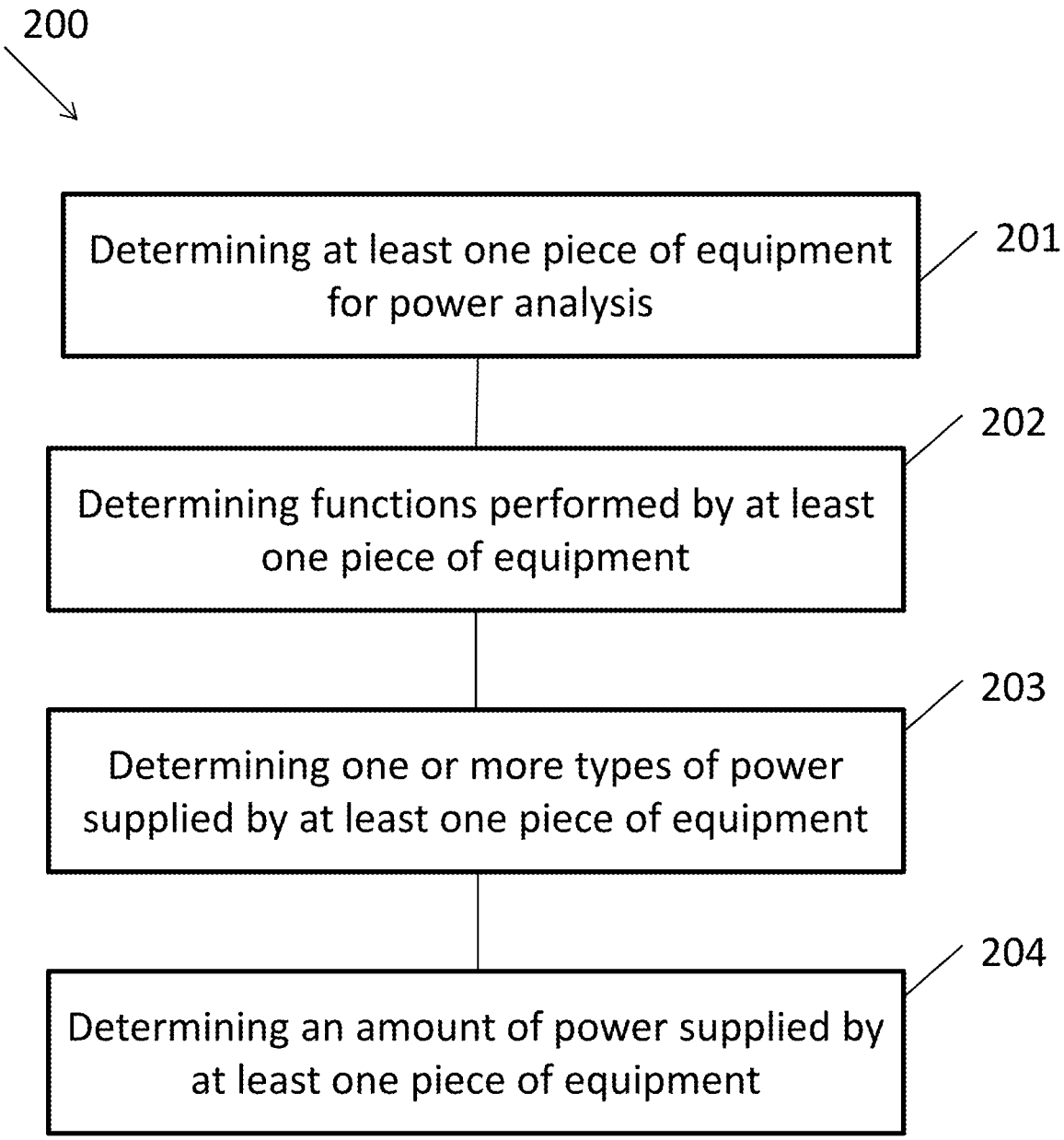
FIG. 2 illustrates a method for analyzing power usage for equipment at an oilfield operation, according to an embodiment.

Analyzing the equipment power usage for the oilfield operation occurs at 101. Analyzing the equipment power usage provides a summary of the power usage for the oilfield operation in terms of what equipment is used, how the equipment is used, and how much power is used. To analyze the equipment power usage for the oilfield operation, a method 200 as shown in FIG. 2 may be utilized. Determining at least one piece of equipment for analysis occurs at 201. The equipment to be analyzed should include all the equipment that is operated during the oilfield operation. The equipment should include all the equipment necessary from start to finish of the operation. Stages of an oilfield operation, such as a fracturing operation, from start to finish may include, but are not limited to spotting and rig-up, start-up, prime-up, pumping and rig down stages. Any oilfield operation or any industrial process that involves energy consumption may be analyzed. For example, the equipment listed in Table 1 may be considered for the power analysis of a fracturing operation which may be used in the spotting and rig-up, start-up, prime-up, pumping and rig down stages of a fracturing operation.

TABLE 1

Equipment considered for power analysis for fracturing operation
Equipment type

Blender
Hydration unit
Fracturing pump
Sand delivery unit
Transfer pump
Manifold trailer
Monitoring unit
Crane
Liquid transport
Gas Operated Relief Valve While the equipment listed in Table 1 may be a single unit, the listed equipment may also include multiple units for use during operation or from a reliability standpoint. For example, there will typically be more than one fracturing pump for a fracturing operation. The number of equipment may be determined by one of ordinary skill in the art based upon the details of the oilfield operation. Furthermore, while a single piece of equipment may be listed, the single piece of equipment may include more than one power source (i.e., engines). For example, a fracturing pump may include a deck engine and a tractor engine.

Determining the functions performed by at least one piece of equipment for the oilfield operation occurs at 202. The functions performed may refer to the nature of the functions performed by the considered sources. The functions (power usage) may be selected from amongst the following options, but are not limited to, operation, value added auxiliary, non-value added auxiliary, and transportation. Operation refers to those functions used directly in the oilfield operation, such as in a fracturing operation, the "operation" functions refer to those sources directly used to fracture the formation. Value added auxiliary refers to those side functions that may be necessary to perform the oilfield operation. Non-value added auxiliary refers to those side functions that may not be necessary to perform the oilfield operation. Transportation refers to those used during transportation, for example if the source is located on a trailer such as to be relocated from oilfield location to oilfield location.

Determining the types of power supplied to at least one piece of equipment for the oilfield operation occurs at 203. The types of power refer to the nature of the power supplied to the equipment to perform the functions determined at 202. The types of power which may be supplied include, but are not limited to, mechanical, hydraulic, electrical, and pneumatic. Mechanical power may be supplied by a direct drive. Hydraulic power may be supplied by pumps and/or motors. Pneumatic power may be supplied by a pneumatic compressor. Electrical power may be supplied by a battery and alternator. While only limited examples of power sources has been described, it is understood that one of ordinary skill in the art would be aware of the many sources of power that could be used for supplying the types of power utilized at the oilfield operation. For a fracturing operation, the types of power which may be supplied include mechanical, hydraulic, electrical, and pneumatic.

Determining an amount of power supplied to at least one piece of equipment occurs at 204. The amount of power may quantify the minimal amount power of power to perform the functions determined at 202. In some embodiments, the amount of power may be quantified as horsepower or watts, but the unit is of no limitation. The amount of power may be determined by one of ordinary skill in the art based upon the details of the oilfield operation.

Using the above information, a power break-down analysis may be performed for each piece of equipment in the oilfield operation. In an embodiment, Table 2 details the power break-down analysis for a fracturing pump in a fracturing operation. The table details the equipment type, the power source the power usage, comments related to the power usage, the category of power being supplied, and the minimum power required. As is clear from Table 2, a single piece of equipment may use more than one source and or type of power, and the power usage may be for more than one function.

TABLE 2

Power break-down analysis - Fracturing pump

| Equipment type | Source | Usage | Comments | Power category | Power minimum [HP] |
| --- | --- | --- | --- | --- | --- |
| Fracturing Pump | Deck engine | Fracturing | Pump operation | Mechanical | 2000 |
| | | Value added auxiliary | Engine fan | Hydraulic | 180 |
| | | Value added auxiliary | Alternator | Electrical | 10 |
| | | Value added auxiliary | Trailer air compressor | Pneumatic | 10 |
| | Tractor engine | Value added auxiliary | Deck engine startup | Hydraulic | 70 |
| | | Transportation | Transportation | Mechanical | 200 |
| | | Non-value added auxiliary | Engine fan | Hydraulic | 30 |
| | | Non-value added auxiliary | Alternator | Electrical | 10 |
| | | Non-value added auxiliary | Trailer air compressor | Pneumatic | 10 |

While Table 2 details the power analysis for a fracturing pump, to achieve a power analysis of the fracturing operation, a power analysis would be performed for each piece of equipment used in the operation, such as those listed in Table 1, for example. Thus, tables for each piece of equipment for the oilfield operation would be summarized to provide the total power usage for the oilfield operation.

Referring back to FIG. 1, after summarizing the power usage for the oilfield operation, mapping the power consumption for the oilfield operation occurs at 102. Mapping the power consumption may provide a pictorial view of the power consumption for each piece of equipment for each stage of the oilfield operation. For example, using the power break-down analysis of the fracturing pump shown in Table 2, the power analysis is mapped for each stage of the fracturing operation as shown in Table 3.

TABLE 3

Power mapping - Fracturing pump

| Equipment type | Source | Comments usage | Stages of a Fracturing Job | | | | |
|---|---|---|---|---|---|---|---|
| | | | Spotting & Rig Up | Start Up | Prime Up | Pumping | Rig Down |
| Fracturing Pump | Deck engine | Pump operation | | | X | X | |
| | | Engine fan | | | X | X | |
| | | Alternator | | | X | X | |
| | | Trailer air compressor | | | X | X | |
| | Tractor engine | Deck engine startup | | X | | | |
| | | Transportation | X | | | | |
| | | Engine fan | X | X | | | |
| | | Alternator | X | X | | | |
| | | Trailer air compressor | X | X | | | |

Figure 3:
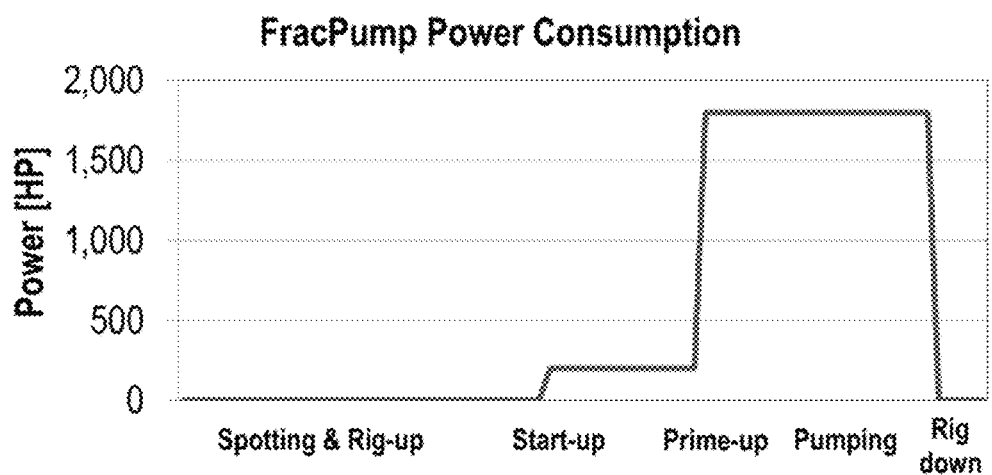
FIG. 3 illustrates a power consumption map for a series of fracturing pump deck engines at an oilfield operation, according to an embodiment.

To map the power consumption of a piece of equipment, the stages of the oilfield operation may be plotted along the x-axis and the power consumption is plotted along the y-axis. A graphic representation of the power consumption may be plotted for each piece of equipment for the oilfield operation. For the fracturing operation, a graphic interpretation for the power consumption of the fracturing pump deck engine may be seen in FIG. 3. FIG. 3 combines the combines the power break-down analysis of Table 2 with the power map of Table 3. A graphic representation of the power consumption for the oilfield operation may be plotted for each piece of equipment and each power source for the oilfield operation. A summary of the power consumption for the oilfield operation may be shown by providing the pieces of equipment along the z-axis. One of ordinary skill in the art would understand that the oilfield operation, the power consumption and the pieces of equipment may be plotted against each other, regardless of the axis they are plotted on.

Referring back to FIG. 1, after mapping the power consumption for the oilfield operation, mapping the power utilization for the oilfield operation occurs at 103. Mapping the power utilization may provide a pictorial view of the power utilization for each piece of equipment for each stage of the oilfield operation. To map the power utilization of an oilfield operation, the power utilization is determined for each piece of equipment in the oilfield operation plotted on a single plot. For any power source, at any given time in the oilfield operation, power utilization may be defined as the ratio of power used over the total power available on the source, as shown in Equation (1) below:

$$\text{Power utilization} = \frac{\text{Instantaneous power}}{\text{Total power available}} \quad (1)$$

Figure 4:
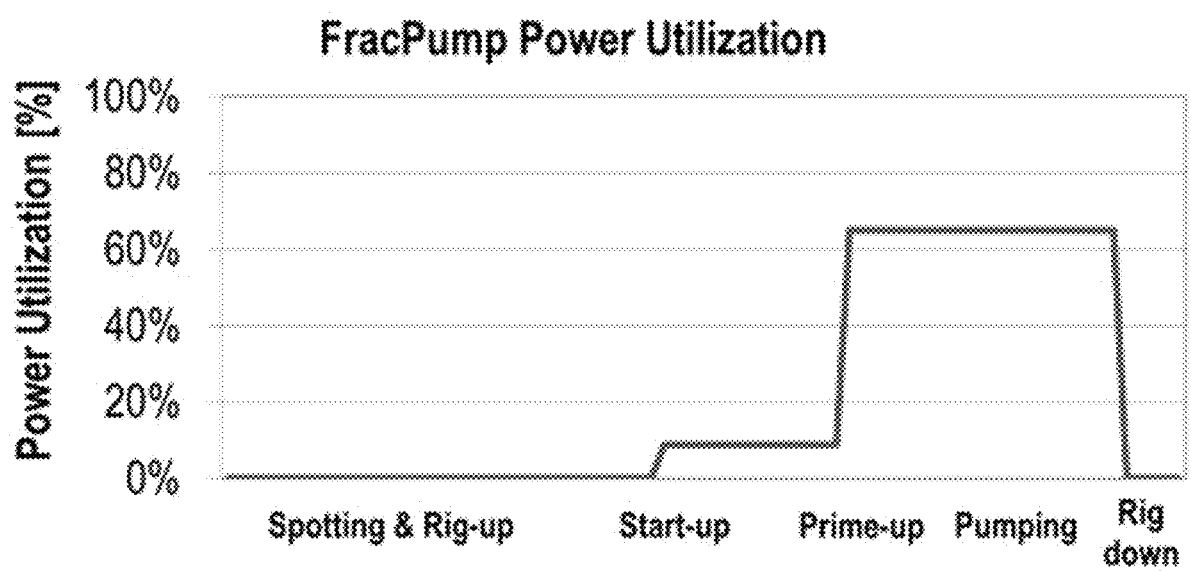
FIG. 4 illustrates a power utilization map for a series of fracturing pump deck engines at an oilfield operation, according to an embodiment.
Figure 5:
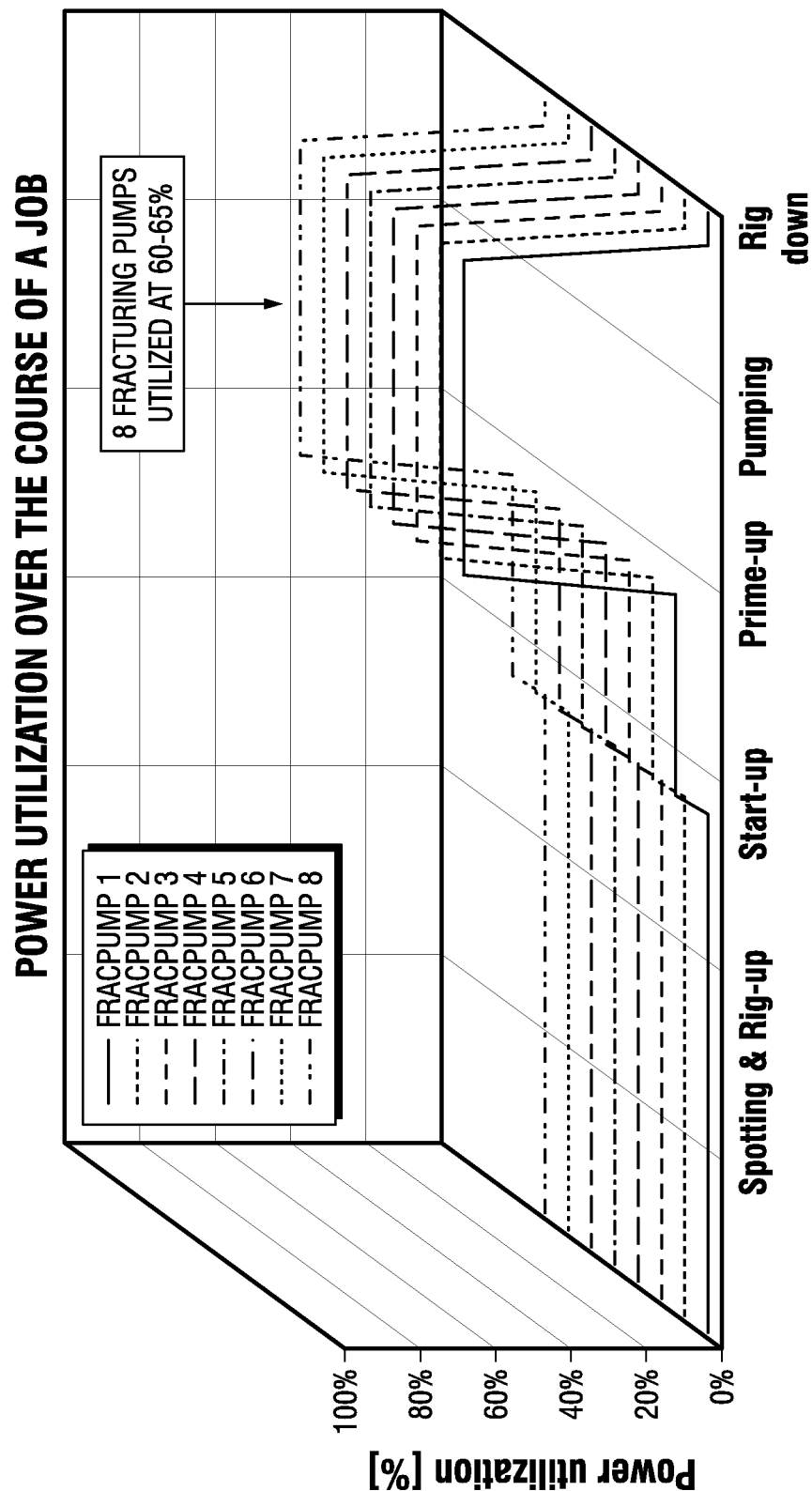
FIG. 5 illustrates a power utilization map for the fracturing pump deck engines located at an oilfield operation utilized during a fracturing operation, according to an embodiment.

The ratio may range from about 0% to about 100%, with 0% referring to none of the available power being utilized and 100% referring to all of the available power being utilized. For the fracturing operation, a graphic interpretation for the power utilization of the fracturing pump deck engine may be seen in FIG. 4. While FIG. 4 illustrates the utilization of a single fracturing pump deck engine, in some embodiments more than one fracturing pump is necessary for the operation. For example, at a typical fracturing operation about 8 to about 12 fracturing pumps may be utilized to supply fracturing fluid downhole. As such, FIG. 5 illustrates the power utilization of the plurality of fracturing pump deck engines at the oilfield location.

Figure 6:
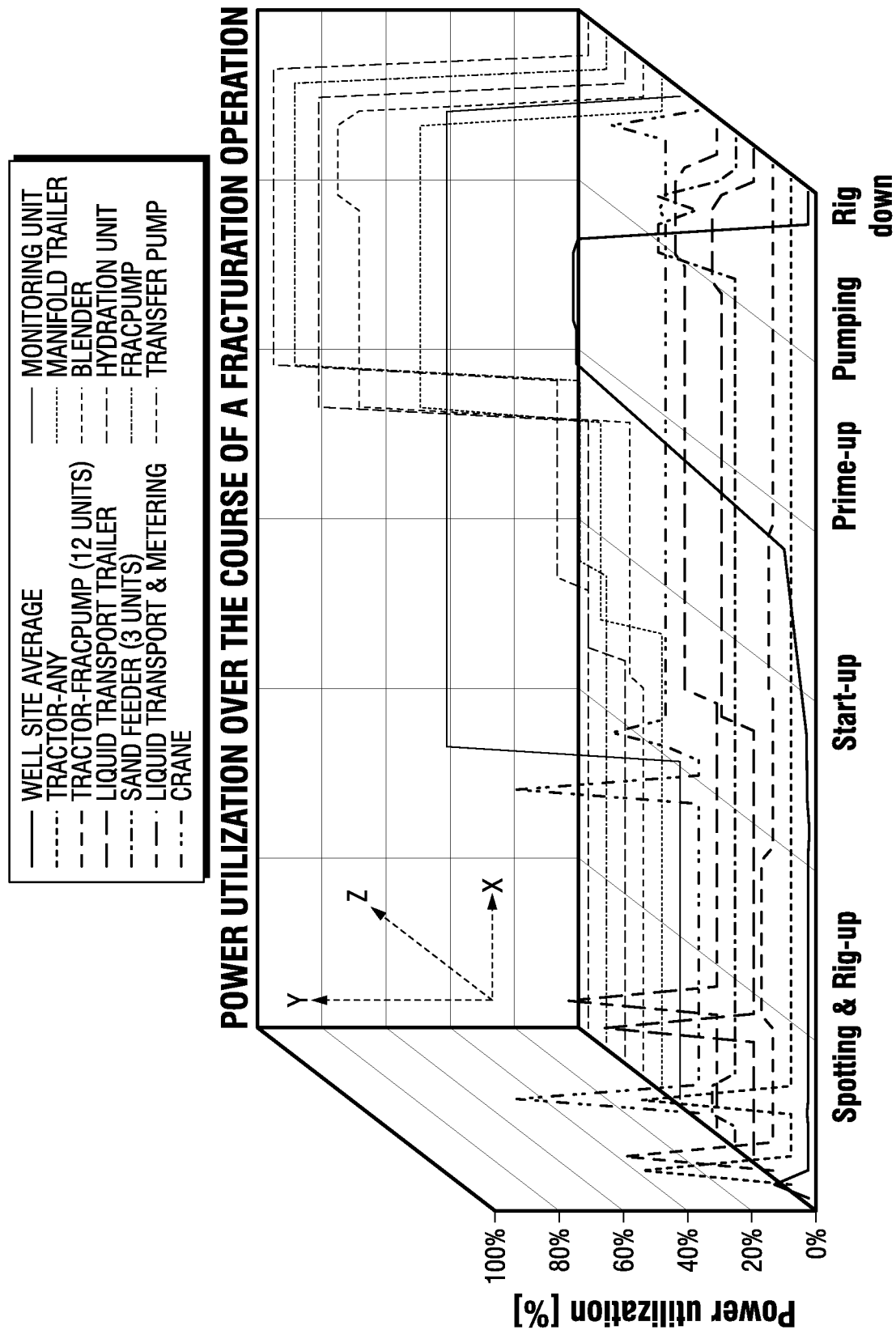
FIG. 6 illustrates a method for mapping power utilization for conventional equipment of a fracturing operation at an oilfield operation, according to an embodiment.

For a fracturing operation, a plot of power utilization over the course of the fracturing operation may be shown in a 3-axis display with the time and/or the stages of the oilfield operation plotted along the x-axis, the power utilization is plotted along the y-axis, and the equipment plotted along the z-axis, as shown in FIG. 6. The plot shows an overview of the power utilization at an oilfield operation, at any time of a job for any equipment present at the location. One of ordinary skill in the art would understand that the time and/or the stages of the oilfield operation, the power utilization and the pieces of equipment may be plotted against each other, regardless of the axis they are plotted on.

Referring back to FIG. 1, after mapping the power utilization for the oilfield operation, improving the power utilization for the oilfield operation occurs at 104. By understanding the power utilization for all the equipment at the oilfield operation, improvement of the power consumption/utilization for the oilfield operation may be determined. In some embodiments, the improvement to power utilization may be done, for example, by increasing equipment utilization (y-axis), reducing the number of equipment (z-axis) and/or reducing the duration of each stage of the job (x-axis). Operating an optimized oilfield operation may minimize overall equipment engine hours of operation, generating maintenance savings, fuel savings and limit the carbon footprint of the oilfield operation.

In some embodiments, the power utilization of fracturing pump deck engines (or other equipment) at an oilfield location may be improved by consolidating redundant power sources to increase power utilization among the consolidated pieces of equipment. As shown in FIG. 5, in an embodiment for a fracturing operation, eight (8) fracturing pump deck engines are operated at a range from about 65 to about 70% utilization to provide the power for the fracturing operation. So long as performance requirements can be met, by increasing the utilization of the fracturing pump deck engines to a range from about 85 to about 95%, the number of fracturing pump deck engines may be reduced, for example, to six (6) while still providing the power for the fracturing operation.

Figure 7:
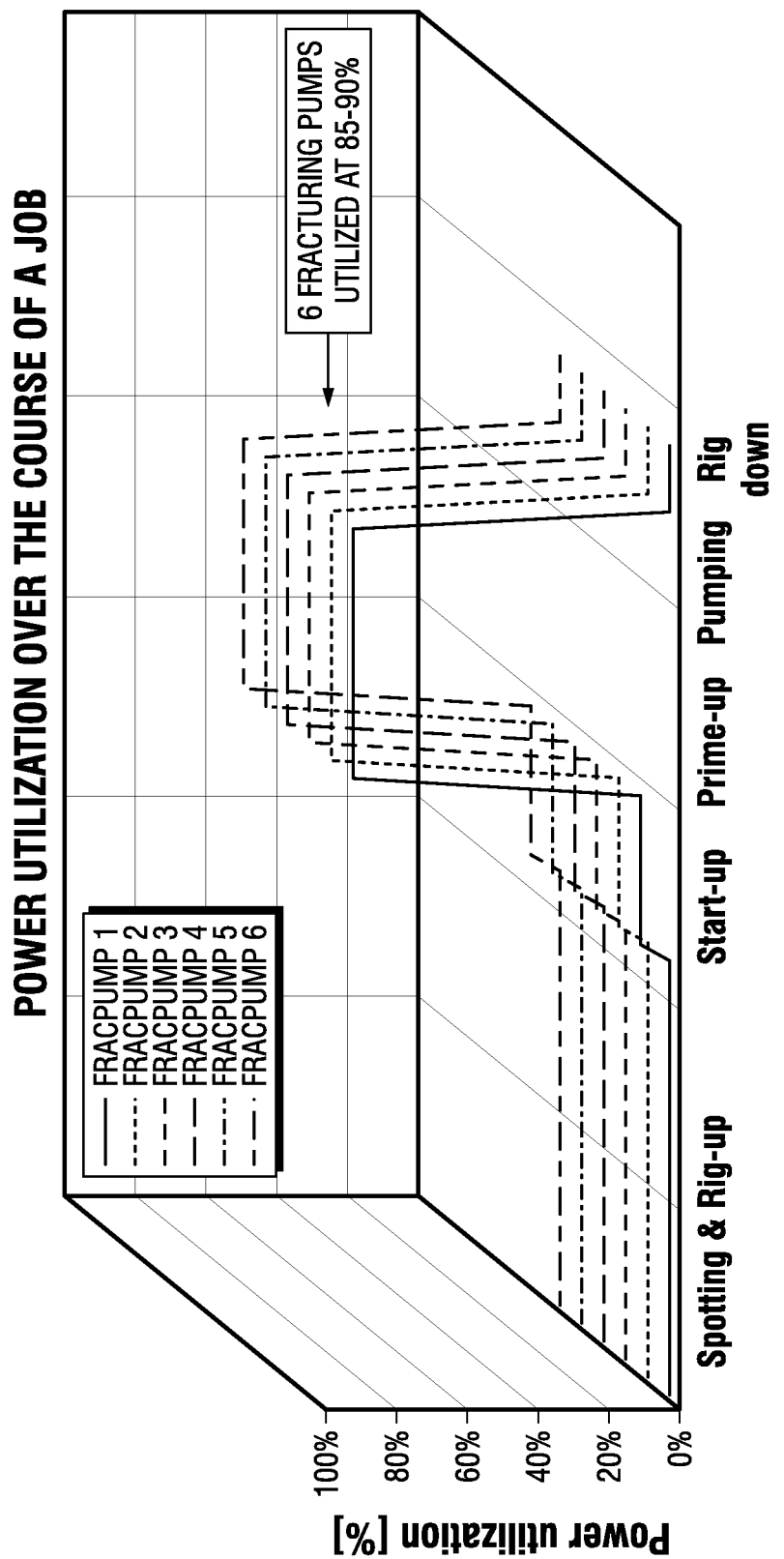
FIG. 7 illustrates an optimized power utilization map for the fracturing pump deck engines located at an oilfield operation utilized during a fracturing operation, according to an embodiment.

A graphic representation of the optimized fracturing pump power utilization is shown in FIG. 7. By reducing the number of fracturing pump deck engines, the associated spotting time, rig-up time and prime-up time may also be reduced, thus minimizing the duration of each stage of the oilfield operation (x-axis). In other embodiments, the number of pieces of equipment may be increased, such that the assets may be better utilized while also increasing the utilization of the assets.

Figure 8:
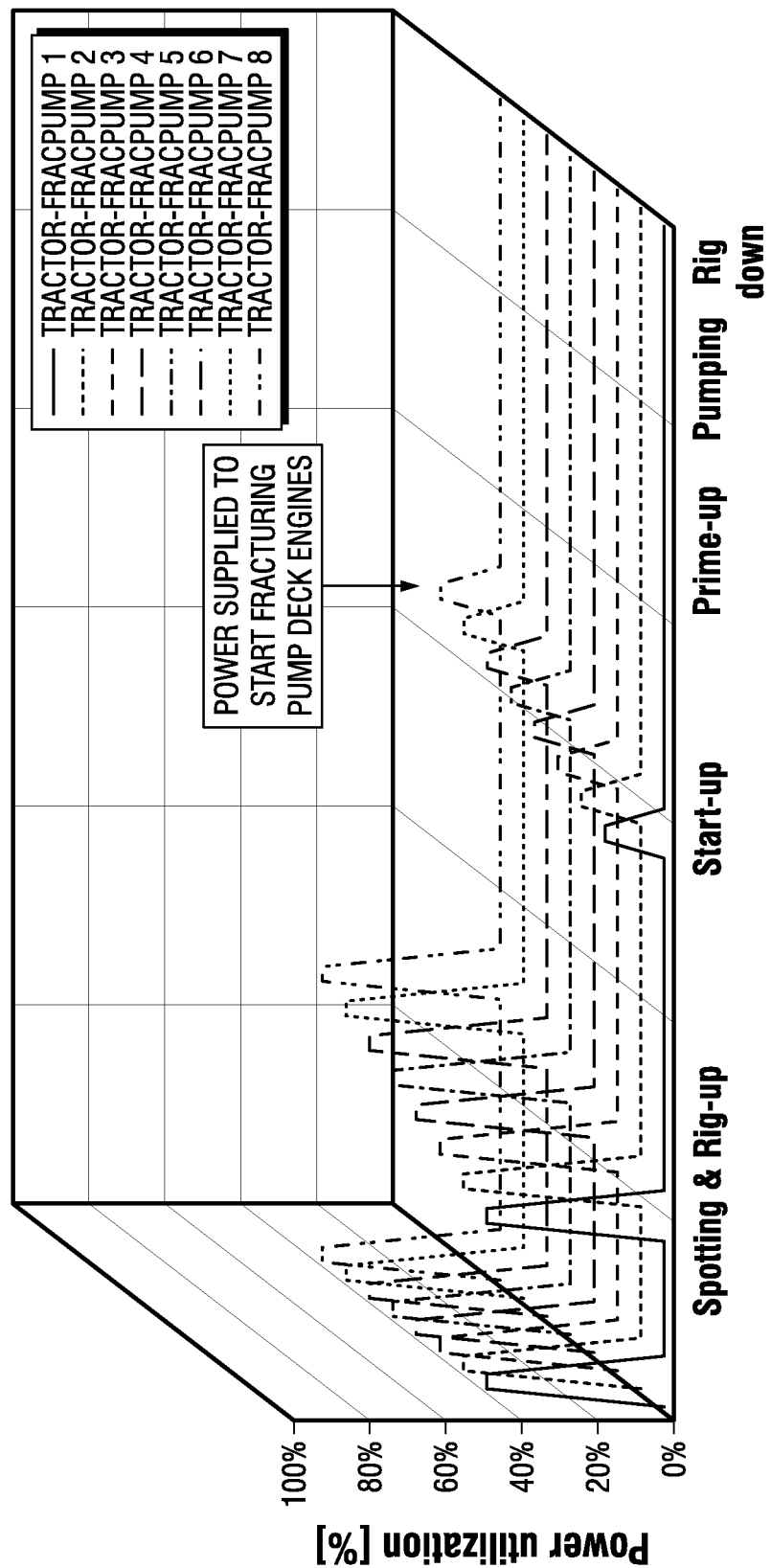
FIG. 8 illustrates a power utilization map for the fracturing pump tractor engines located at an oilfield operation utilized during a fracturing operation, according to an embodiment.
Figure 9:
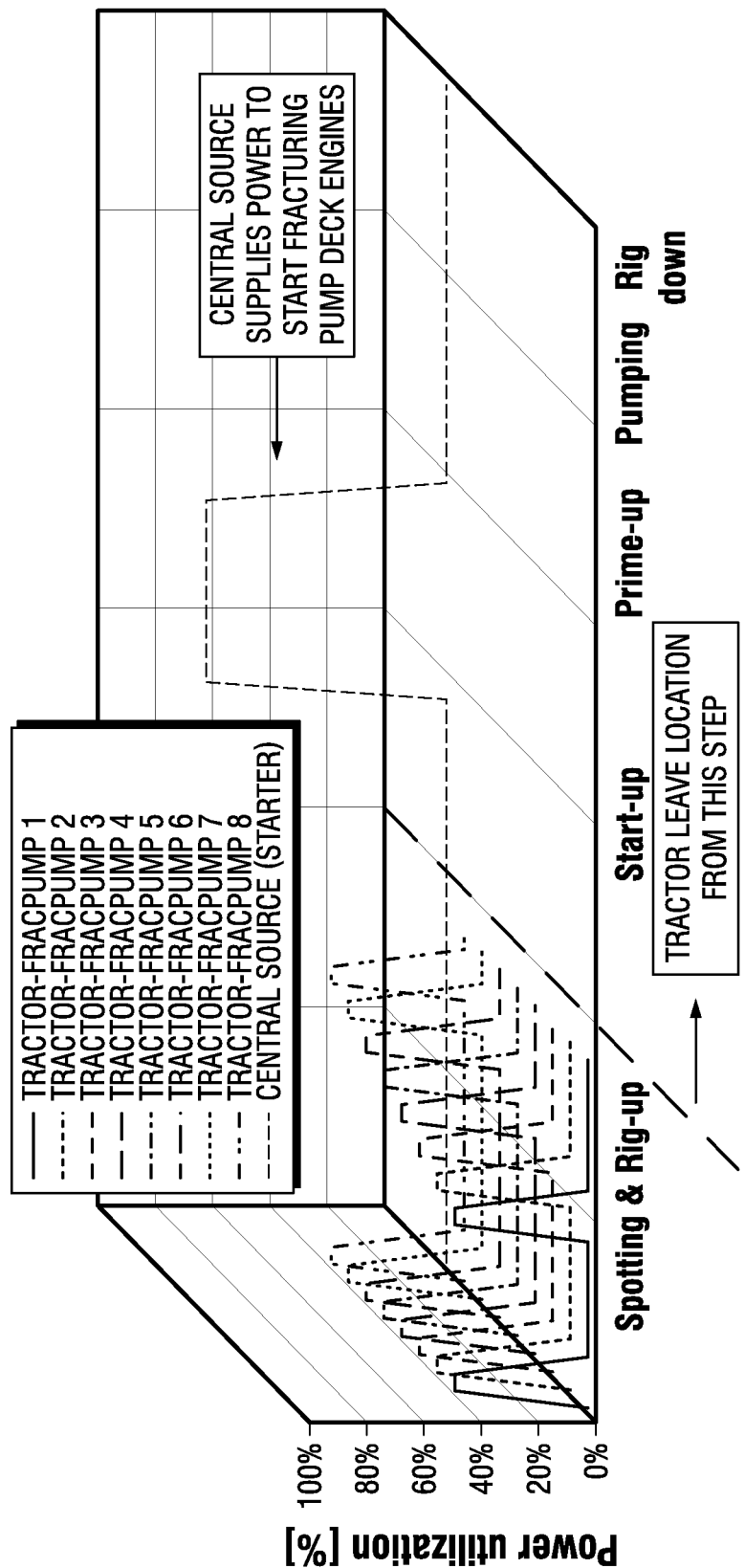
FIG. 9 illustrates an optimized power utilization map for the fracturing pump tractor engines located at an oilfield operation utilized during a fracturing operation, according to an embodiment.

In another embodiment, to properly utilize equipment, transferring functions of equipment that poorly utilize power to other equipment may be performed. The maximization of equipment power utilization may be accomplished by refocusing the equipment usage to the core function the equipment has been designed and transferring poorly utilized functions to other pieces (types) of equipment. For example, in some embodiments, fracturing pump deck engine start-up is performed by numerous tractors which also haul the fracturing pumps to the oilfield location and spot the fracturing pumps. As shown in FIG. 8, the power utilization for the tractor engines to start the fracturing pump deck engines ranges from about 10 to about 20%. By improving the usage of the tractor engines to their core function during the oilfield operation, namely spotting and rig-up, higher power utilization may be realized. To start the fracturing pump deck engines, in some embodiments, a dedicated central power source may be brought on site. The dedicated central power source may have higher power utilization than the tractor engines, for example, ranging from about 60 to about 80% as shown in FIG. 9. By using a dedicated central power source instead of the tractor engines for starting the fracturing pump deck engines, the tractor engine may be removed from the oilfield operation after spotting and rig-up and be utilized elsewhere. Thus, in one or more embodiments, the optimization may include identifying alternate sources of power for one or more pieces of equipment and/or identifying alternate equipment to perform a given function. In some embodiments, the optimization may include the use of a dedicated central power source, but the present disclosure is not so limited.

In other embodiments, the method can be extended to maintenance operations where oilfield operation stages may be substituted with maintenance cycle stages and power utilization may be substituted with the maintenance availability (i.e, on/off) of the equipment considered, while the pieces of equipment may still be plotted on the z-axis. In some embodiments, maintenance bays may be plotted on the z-axis. One of ordinary skill in the art would understand that the maintenance cycle stages, the maintenance availability and the pieces of equipment may be plotted against each other, regardless of the axis they are plotted on. Maintenance cycles may be superimposed on or plotted against the equipment utilization graph, such that maintenance may be performed on the equipment when it is not functioning (i.e., 0% utilization). By reducing the combined maintenance and operation time, an increase in equipment availability and a reduction in total operation time may be achieved. Thus, in one or more embodiments, the maintenance operations may be improved and/or optimized, the optimization may involve reducing the duration, increasing utilizations, etc., similar to as described above. Further, it is also envisioned that the oilfield operation and maintenance maps may be combined to optimize the sequence of the oilfield operation and maintenance cycles, including in relation to one another. For example, a maintenance cycle may be performed on a piece of equipment during a stage in the oilfield operation in which the equipment has zero utilization, thus reducing the overall time.

In still other embodiments, the method can be extended to optimizing maintenance operations having the department performing tasks (i.e., electrical, hydraulic, mechanical, etc.), the maintenance time, and the equipment all plotted against each other.

While the present teachings have been illustrated with respect to one or more embodiments, alterations and/or modifications may be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A method for improving power usage for an oilfield operation, the method comprising:
    operating oilfield equipment at an oilfield location to perform the oilfield operation;
    determining one or more pieces of the oilfield equipment operated during the oilfield operation;
    determining at least one function of the oilfield operation performed by at least one piece of the oilfield equipment;
    determining one or more types of power supplied to the at least one piece of equipment to perform the at least one function of the oilfield operation;
    determining an amount of power supplied to the at least one piece of equipment to perform the at least one function of the oilfield operation;
    analyzing power usage of the one or more pieces of the oilfield equipment for performance of each of a plurality of stages of the oilfield operation;
    mapping power consumption of the one or more pieces of the oilfield equipment for performance of each of the plurality of stages of the oilfield operation;
    mapping power utilization of the one or more pieces of the oilfield equipment for performance of each of the plurality of stages of the oilfield operation, wherein mapping power utilization comprises plotting each of the plurality of stages of the oilfield operation along a first axis, the power utilization of the one or more pieces of the oilfield equipment along a second axis, and the one or more pieces of the oilfield equipment along a third axis against each other in a three-dimensional graphical presentation, and wherein the power utilization of the one or more pieces of the oilfield equipment comprises a ratio of power used by the one or more pieces of the oilfield equipment over a total available power; and improving power utilization for the one or more pieces of the oilfield equipment for performance of the oilfield operation.

2. The method of claim 1, wherein determining one or more types of power comprises determining the nature of power supplied to the at least one piece of the oilfield equipment to perform the at least one function of the oilfield operation performed by the at least one piece of the oilfield equipment.

3. The method of claim 2, wherein the nature of the power supplied to the at least one piece of equipment to perform the at least one function comprises mechanical power, hydraulic power, pneumatic power, and combinations thereof.

4. The method of claim 3, wherein the nature of the power supplied to the at least one piece of equipment to perform the at least one function comprises electrical power.

5. The method of claim 1, wherein determining an amount of power comprises quantifying a minimum amount power to perform the at least one function of the oilfield operation performed by the at least one piece of the oilfield equipment.

6. The method of claim 1, wherein mapping power consumption comprises plotting each of the plurality of stages of the oilfield operation along an additional first axis, the amount of power supplied to the one or more pieces of the oilfield equipment along an additional second axis, and the one or more pieces of the oilfield equipment against each other along an additional third axis in an additional three-dimensional graphical presentation.

7. The method of claim 1, wherein improving power utilization for the oilfield operation is selected from the group comprising increasing equipment utilization, reducing a number of pieces of the oilfield equipment, reducing a duration of at least one stage of the oilfield operation, identifying alternate sources of power for one or more pieces of the oilfield equipment, and identifying alternate oilfield equipment to perform a given function of the oilfield operation.

8. The method of claim 1, wherein improving power utilization for the oilfield operation comprises refocusing equipment usage to a core function for which the one or more pieces of equipment has been designed, and transferring poorly utilized functions to other pieces of equipment.

9. The method of claim 1, wherein the oilfield operation comprises a fracturing operation, and wherein the oilfield equipment is configured to perform the fracturing operation.

10. The method of claim 9, wherein the oilfield equipment comprises a blender, a hydration unit, a fracturing pump, a sand delivery unit, a transfer pump, a manifold trailer, a monitoring unit, a crane, a liquid transport, a gas operated relief valve, and combinations thereof.

11. A method for improving power usage for a plurality of equipment in an oilfield operation, the method comprising:

operating a plurality of equipment to perform an oilfield operation;

determining an amount of power supplied to the plurality of equipment during performance of each of a plurality of stages of the oilfield operation by the plurality of equipment;

determining power utilization of the plurality of equipment during performance of each of the plurality of stages of the oilfield operation by the plurality of equipment, wherein the power utilization of the plurality of equipment comprises a ratio of power used by the plurality of equipment over a total available power;

mapping power utilization of the plurality of equipment during performance of each of the plurality of stages of the oilfield operation by the plurality of equipment, wherein mapping power utilization comprises plotting each of the plurality of stages of the oilfield operation along a first axis, the power utilization of the plurality of equipment along a second axis, and the plurality of equipment along a third axis against each other in a three-dimensional graphical presentation; and improving power utilization for the plurality of equipment during performance of the oilfield operation by the plurality of equipment.

12. The method of claim 11, wherein improving power utilization for the oilfield operation comprises increasing the power utilization of the plurality of the equipment.

13. The method of claim 11, wherein improving power utilization for the oilfield operation comprises reducing a number of the plurality of equipment.

14. The method of claim 11, wherein improving power utilization for the oilfield operation comprises reducing a duration of at least one stage of the oilfield operation.

15. The method of claim 11, wherein improving power utilization for the oilfield operation comprises identifying alternate sources of power for one or more pieces of equipment.

16. The method of claim 11, wherein improving power utilization for the oilfield operation comprises identifying alternate equipment to perform a given function of the oilfield operation.

17. The method of claim 11, wherein the oilfield operation comprises a fracturing operation, and wherein the plurality of equipment is configured to perform the fracturing operation.

18. The method of claim 17, wherein the plurality of equipment comprises a blender, a hydration unit, a fracturing pump, a sand delivery unit, a transfer pump, a manifold trailer, a monitoring unit, a crane, a liquid transport, a gas operated relief valve, and combinations thereof.

* * * * *